United States Patent [19]

Abthoff et al.

[11] Patent Number: 4,876,852
[45] Date of Patent: Oct. 31, 1989

[54] DIESEL INTERNAL COMBUSTION ENGINE WITH AN EXHAUST GAS LINE SYSTEM

[75] Inventors: Joerg Abthoff, Pluederhausen; Hans-Dieter Schuster, Schorndorf; Hans-Joachim Langer, Remseck; Erwin Strohmer, Berglen; Rolf Gabler, Waiblingen; Roland Schulte, Korb, all of Fed. Rep. of Germany

[73] Assignee: Daimler-Benz Aktiengesellschaft, Stuttgart, Fed. Rep. of Germany

[21] Appl. No.: 176,279

[22] Filed: Mar. 31, 1988

[30] Foreign Application Priority Data

Apr. 3, 1987 [DE] Fed. Rep. of Germany ....... 3711312

[51] Int. Cl.$^4$ .............................................. F01N 3/02
[52] U.S. Cl. ........................................ 60/275; 55/102; 55/DIG. 30
[58] Field of Search ............ 60/275; 55/102, DIG. 30

[56] References Cited

U.S. PATENT DOCUMENTS

| | | | |
|---|---|---|---|
| 3,184,901 | 5/1965 | Main | 55/102 |
| 3,560,363 | 2/1971 | Goetz | 60/275 |
| 3,653,185 | 4/1972 | Scott | 55/102 |
| 3,676,318 | 7/1972 | Lauer | 55/102 |
| 4,376,637 | 3/1983 | Yang | 60/275 |
| 4,406,119 | 9/1983 | Kamiya | 60/275 |
| 4,618,351 | 10/1986 | Esper | 55/146 |
| 4,750,917 | 6/1988 | Fujii | 55/102 |

FOREIGN PATENT DOCUMENTS

| | | |
|---|---|---|
| 2153134 | 5/1973 | Fed. Rep. of Germany. |
| 3500375 | 7/1986 | Fed. Rep. of Germany. |
| 2036951 | 7/1980 | United Kingdom .................. 55/102 |

*Primary Examiner*—Douglas Hart

[57] ABSTRACT

A diesel internal combustion engine in the exhaust gas line system of which is arranged a device for the ionization of soot particles contained in the exhaust gas and a device for the separation thereof from the exhaust gas stream. In order to be able to realize a low structural expenditure, the device for the ionization of the soot particles is constructed as a light source emitting ultraviolet light.

4 Claims, 1 Drawing Sheet

DIESEL INTERNAL COMBUSTION ENGINE WITH AN EXHAUST GAS LINE SYSTEM

BACKGROUND AND SUMMARY OF THE INVENTION

The present invention relates to a diesel internal combustion engine with an exhaust gas line system which is provided with a device for ionizing the soot particles carried along by the exhaust gas stream and with a device for separating the soot particles from the exhaust gas stream downstream of the ionizing device.

Such a diesel internal combustion engine is already disclosed in the DE-OS 35 00 375. However, it is disadvantageous in connection therewith that both the device for the ionization of the soot particles (coagulator) as also the device for the separation thereof requires large structural expenditures. Therebeyond, the power requirement of the coagulator series-connected ahead of the centrifugal separator is relatively large.

The present invention is therefore concerned with the task to provide a diesel internal combustion engine of the aforementioned type in which a soot separation is realizable with a minimum structural expenditure, and whose device for the ionization of the soot particles requires an only low power input.

The underlying problems are solved according to the present invention in that the device for the ionization of the soot particles is constructed as a light source emitting ultraviolet light.

The use of a light source emitting ultraviolet light represents a simple possibility for the ionization of the soot particles contained in the exhaust gas flow of a diesel internal combustion engine, whereby every exhaust gas line system can also be re-fitted with a UV lamp without larger structural expenditure. The same is true for an additional soot particle line, whereby an electric field is built up upstream of the branching place of the additional soot particle line from the exhaust gas line system. A further advantage of the ionization of the soot particles by means of ultraviolet light resides in that a UV lamp with a power input of the order of 3W–4W already completely suffices in order to be able to assure an effective ionization of the soot particles.

BRIEF DESCRIPTION OF THE DRAWINGS

These and other objects, features and advantages of the present invention will become more apparent from the following description, when taken in conjunction with the accompanying drawing which shows, for purposes of illustration only, two embodiments in accordance with the present invention, and wherein.

DETAILED DESCRIPTION OF THE DRAWINGS

Figure 1:
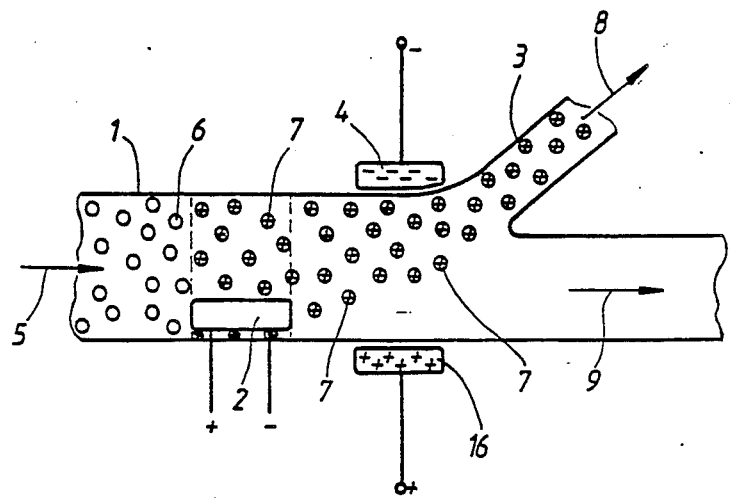
FIG. 1 is a somewhat schematic cross-sectional view through one embodiment of an exhaust gas line system for a diesel internal combustion engine in accordance with the present invention.

Referring now to the drawing wherein like reference numerals are used throughout the two views to designate like parts, FIG. 1 illustrates a portion of an exhaust gas line 1 of a diesel internal combustion engine, not illustrated for the sake of simplicity. A lamp 2 is arranged in the exhaust gas line 1, which in the illustrated section consists of a heat-resistant plastic material; the lamp 2 continuously emits ultraviolet light with a wavelength of about 200 nm during the operation of the internal combustion engine. Downstream of this lamp 2, a soot particle line 3 is branched off from the exhaust gas line 1. On the side of the exhaust gas line 1, where the soot particle line 3 is branched off, an electrostatically negatively charged plate 4 is arranged at a relatively slight distance to the exhaust gas line 1 within the area upstream of the branching place. A further, but positively charged plate 16 is arranged on the oppositely disposed side of the exhaust gas line 1.

With a flow of the exhaust gases assumed in the direction of the arrow 5, the initially still neutral soot particles 6 are ionized within the area of the UV lamp 2 by the irradiation thereof and thus continue to flow as positive charge carriers 7. At the place of the electric field built up by the mutually oppositely charged plates 4 and 16, the charged soot particles 7 are now deflected in the direction of the soot particle line 3 by way of which they are finally adapted to be fed (arrow 8) to the final decontamination (for example, after-burning). The remaining exhaust gas stream, by contrast, is now far-reachingly free of soot particles (arrow 9).

Figure 2:
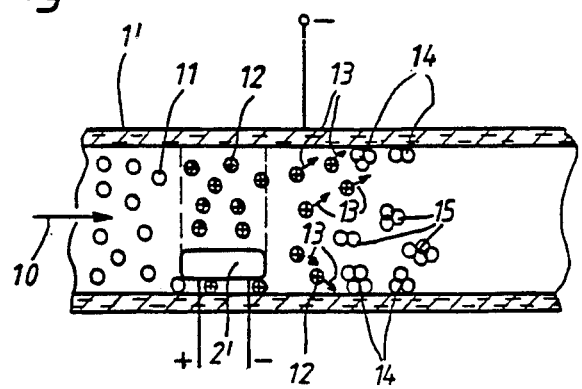
FIG. 2 is a somewhat schematic cross-sectional view through a second embodiment of an exhaust gas line system for a diesel internal combustion engine in accordance with the present invention.

FIG. 2 also illustrates a portion of an exhaust gas line 1' of a diesel internal combustion engine (not illustrated). Also in this case a UV lamp 2' is arranged in the exhaust gas line 1' which irradiates the soot particles 11 contained in the exhaust gas flow (flow direction according to arrow 10) and thus permits the same to become positive charge carriers 12. The exhaust gas line 1' itself is electrostatically charged negative.

The now positively charged soot particles 12 are attracted by the negatively charged exhaust gas line 1' (arrow 13), adhere thereat and are hit in the course of time by further soot particles and are therewith agglomerated into larger soot particles 14. With the attachment to the negatively charged exhaust gas line, the soot particles lose again their charge so that, when they are agglomerated to a predetermined size, they are again redetached from the exhaust gas line 1' by the exhaust gas stream and continue to flow as neutral, but enlarged soot particles 15. Thereafter, the enlarged soot particles 15 can then subsequently removed from the exhaust gas flow, for example, by a centrifugal separator. A further alternative for the separation of the enlarged soot particles from the exhaust gas stream is also the separating possibility illustrated in FIG. 1 by a renewed ionization of the now-enlarged soot particles by way of a further UV lamp with an adjoining intentional deflection by a built-up electric field.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An exhaust gas line system for a diesel internal combustion engine comprising ionizing means in the course of the exhaust gas line system for ionizing soot particles taken along in the exhaust gas stream, separating means downstream of the ionizing means for separating the soot particles out of the exhaust gas stream, the means for ionizing the soot particles being constructed as light source means emitting ultraviolet light in a wavelength range between about 10 nm and 400 nm, wherein a soot particle line branches off from the exhaust gas line system downstream of the ionizing means, and wherein within the area upstream of the branching place, an electric field is built up in which the soot particles are deflected in the direction of the soot particle line, and wherein the exhaust gas line system within the area upstream of the branching consists of an electrically non-conductive material.

2. An exhaust gas line system for a diesel internal combustion engine according to claim 1, wherein a first plate is arranged on the side of the exhaust gas line system where the soot particle line is branched off, said first plate having a charge opposite to the charge of the soot particles, and wherein a second plate is arranged on the oppositely disposed side which has a charge opposite to the first plate.

3. An exhaust gas line system for a diesel internal combustion engine comprising ionizing means in the course of the exhaust gas line system for ionizing soot particles taken along in the exhaust gas stream, separating means downstream of the ionizing means for separating the soot particles out of the exhaust gas stream, the means for ionizing the soot particles being constructed as light source means emitting ultraviolet light, wherein a soot particle line branches off from the exhaust gas line system downstream of the ionizing means, and wherein within the area upstream of the branching place, an electric field is built up in which the soot particles are deflected in the direction of the soot particle line, and wherein the exhaust gas line system within the area upstream of the branching consists of an electrically non-conductive material.

4. An exhaust gas line system for a diesel internal combustion engine comprising ionizing means in the course of the exhaust gas line system for ionizing soot particles taken along in the exhaust gas stream, separating means downstream of the ionizing means for separating the soot particles out of the exhaust gas stream, the means for ionizing the soot particles being constructed as light source means emitting ultraviolet light, wherein a soot particle line branches off from the exhaust gas line system downstream of the ionizing means, and wherein within the area upstream of the branching place, an electric field is built up in which the soot particles are deflected in the direction of the soot particle line, and wherein a first plate is arranged on the side of the exhaust gas line system where the soot particle line is branched off, said first plate having a charge opposite to the charge of the soot particles, and wherein a second place is arranged on the oppositely disposed side which as a charge opposite to the first plate.

* * * * *